United States Patent [19]

Kamoshita et al.

[11] Patent Number: 5,180,779

[45] Date of Patent: Jan. 19, 1993

[54] THERMOPLASTIC RESIN COMPOSITIONS RESISTANT TO FLUORINATED/CHLORINATED HYDROCARBONS AND THE USE THEREOF

[75] Inventors: Ryuji Kamoshita; Hiroki Kashiwagi; Koji Takimoto, all of Yokkaichi, Japan

[73] Assignee: Monsanto Kasei Company, Tokyo, Japan

[21] Appl. No.: 623,656

[22] PCT Filed: Oct. 24, 1989

[86] PCT No.: PCT/JP89/01091

§ 371 Date: Dec. 20, 1990

§ 102(e) Date: Dec. 20, 1990

[87] PCT Pub. No.: WO90/12823

PCT Pub. Date: Nov. 1, 1990

[30] Foreign Application Priority Data

Apr. 27, 1989 [JP]  Japan ................................. 1-108746

[51] Int. Cl.$^5$ .............................. C08L 9/02; C08L 9/06
[52] U.S. Cl. ............................... 525/87; 525/86; 525/316
[58] Field of Search ................... 525/78, 86, 87, 316

[56] References Cited

U.S. PATENT DOCUMENTS

3,819,762  6/1974  Howe ................................ 525/316
3,963,807  6/1976  Howe ................................. 525/86

FOREIGN PATENT DOCUMENTS

1404050  8/1975  United Kingdom .
2067579  7/1981  United Kingdom .

OTHER PUBLICATIONS

Database WPIL, Accession No. 83-737303, Derwent Publications Ltd., London, GB.
Database Chemical Abstracts, vol. 82, No. 24, 1975, Abstract No. 157294q.

*Primary Examiner*—Jacob Ziegler
*Attorney, Agent, or Firm*—Wenderoth, Lind & Ponack

[57] ABSTRACT

A high nitrile thermoplastic resin composition having fluorinated/chlorinated hydrocarbon resistance and comprising a specifically defined graft copolymer obtained by polymerizing a vinyl cyanide compound and an aromatic vinyl compound in the presence of a conjugated diene-based synthetic rubber, or a blend of it and a vinyl cyanide compound/aromatic vinyl compound copolymer, and its use as a fluorinated/chlorinated hydrocarbon-resistant internal box of a refrigerator.

2 Claims, No Drawings

THERMOPLASTIC RESIN COMPOSITIONS RESISTANT TO FLUORINATED/CHLORINATED HYDROCARBONS AND THE USE THEREOF

TECHNICAL FIELD

The present invention relates to an internal box of a refrigerator which has excellent flon resistance. More specifically, the present invention relates to an internal box of a refrigerator which is endowed with anti-flon property such as high stress cracking resistance, particularly against HCFC-123 and HCFC-141b, by using a high nitrile content thermoplastic resin having a specific composition. The term "flon" is used in the same meaning as a fluorinated/chlorinated hydrocarbon.

In addition, the phraseology "an internal box of a refrigerator" includes the interior of a door of the refrigerator.

BACKGROUND ART

The housing of a refrigerator recently used is one formed as a thermal insulation housing manufactured by a method wherein a space between an internal box and an external box which has been constructed by combining the two boxes is filled with a foam produced by injecting, foaming and solidifying a rigid polyurethane foam stock within the space (referred to hereinafter as in-situ foaming method). Also in the door of the refrigerator, a rigid polyurethane foam is charged as a thermal insulator by the in-situ method between the space which has been constructed by combining the internal and external boxes.

Hitherto, an ABS resin widely used for various purposes has been primarily used as the internal box of a refrigerator. The phraseology "ABS resin widely used for various purposes" means a resin composition which is obtained polymerizing a monomer mixture of 10–40% by weight of a of a vinyl cyanide compound and 60–90% of an aromatic vinyl compound in the presence poly(conjugated diene) synthetic rubber or, in other words, by graft copolymerizing the monomer mixture; or a resin composition in which a copolymer of a vinyl cyanide compound/aromatic vinyl compound is blended with the graft copolymer so that the content of the vinyl cyanide compound is in the range of 10–40% by weight.

As the reason why an ABS resin has been used as a material of an internal box of a refrigerator, there are mentioned a high balance of physical properties such as rigidity and impact property, easy formability, excellent glossy appearance and stress cracking resistance against a flon such as CFC-11 (trichloromonofluoromethane) which is a foaming agent for a rigid polyurethane foam. The internal box of a refrigerator is produced by a heat forming method of a thermoplastic resin sheet, for example by a vacuum forming technique, so that the sheet should have easy formability, particularly vacuum formability. The internal box obtained by the vacuum forming has an average thickness of less than 1 mm, and thus it should have high modulus in order to avoid deformation. If a rigid polyurethane foam is charged into a space which is formed by combining an internal box made of the ABS resin with an external box made of a steel sheet by the in-situ method, the rigid polyurethane foam adheres to the ABS resin and the steel sheets thus causing stress attributed to the difference in the linear expansion coefficients of the steel sheet/rigid polyurethane foam/ABS resin during the operation of the refrigerator. Therefore, the internal box should have stress cracking resistance against CFC-11 as a foaming agent for the rigid polyurethane foam. As notch effect is produced by the adhesion of the rigid polyurethane foam, the internal box is required to have a high notched Izod impact value. Furthermore, excellent gloss is required in order to improve the appearance of the refrigerator.

CFC-11 as a foaming agent for a rigid polyurethane foam contains chlorine and is non-decomposable. Thus, it is suspected that it can destroy the ozone stratum in the stratosphere and there is thus a worldwide trend to the restriction of its use. As an alternative to CFC-11 for use as a foaming agent for a rigid polyurethane foam, another fluorinated/chlorinated hydrocarbon such as HCFC-123 (1-hydro-1,1-dichloro-2,2,2-trifluoroethane) is now to be used. However, HCFC-123 has by far a higher solubility of an ABS resin therein than CFC-11, and the internal box of a refrigerator made of the ABS resin in which a rigid polyurethane foam has been charged by the in-situ method will easily produce craze or crack under stress to lose the article value of the refrigerator. Therefore, under such a trend, it is necessary to prepare an internal box of a refrigerator and the interior of a refrigerator door with a material which has a stress cracking resistance against HCFC-123, and in the same time as usual has a high balance of physical properties such as rigidity and impact property, easy formability and excellent glossy appearance.

DISCLOSURE OF THE INVENTION

The present inventors have conducted earnest researches. As a result, they have discovered that a high nitrile content thermoplastic resin having a specific composition has a stress cracking resistance against HCFC-123 as well as a high balance of physical properties such as rigidity and impact property, easy formability and excellent appearance, and that an internal box of a refrigerator which has overcome the aforementioned problems is obtained by using the high nitrile content thermoplastic resin. Thus, the present invention has been accomplished.

In other words, the flon-resistant internal box of a refrigerator according to the present invention is manufactured with a thermoplastic resin composition, which thermoplastic resin composition comprises (a) a high nitrile thermoplastic resin composition comprising a graft copolymer which is obtained by polymerizing, in the presence of 10 to 20 parts by weight of a conjugated diene-based synthetic rubber, 80 to 90 parts by weight of a monomer mixture consisting essentially of 50 to 75% by weight of a vinyl cyanide compound and 25 to 50% by weight of an aromatic vinyl compound, the parts by weight and % by weight being respectively the values based on the total of the above-described components in question being 100, and/or (b) a high nitrile thermoplastic resin composition comprising a blend of a graft copolymer which is obtained by polymerizing, in the presence of 20 to 70 parts by weight of a conjugated diene-based synthetic rubber, 30 to 80 parts by weight of a monomer mixture consisting essentially of 50 to 75% by weight of a vinyl cyanide compound and 25 to 50% by weight of an aromatic vinyl compound, and a vinyl cyanide compound/aromatic vinyl compound copolymer having a content of the vinyl cyanide compound of 50 to 75% by weight, wherein the resin composition has a rubber content of 10 to 20% by weight, the parts by weight and % by weight being respectively the values based on the total of the above-described components in question being 100.

The high nitrile content thermoplastic resin composition used as an internal box material of a refrigerator has a high stress cracking resistance against flons such as CFC-11, HCFC-123, HCFC-141b and mixtures thereof used as a foaming agent. The high nitrile content thermoplastic resin composition in accordance with the present invention falls within a class of ABS resins and thus has properties which are inherent in the ABS resins and are required for the internal box of a refrigerator.

The resin composition according to the present invention has the following excellent properties.

i) Vacuum formability

The specific viscosity of a matrix portion of the resin composition is adjusted to be at a preferable level, and thus the vacuum-formed internal box of a refrigerator is uniform and improved.

(ii) Punching property

The internal box of a refrigerator manufactured from the resin composition of the present invention has excellent rigidity and impact resistance and thus scarcely produces undesirable phenomena such as the generation of cracking from holes produced upon punching.

(iii) Adhesiveness to polyurethane foam

The intrernal box of a refrigerator manufactured from the resin composition of the present invention, which has a moderate vinyl cyanide content, thus has a good adhesiveness to polyurethane foam. If the internal box has a higher vinyl cyanide content in the resin composition used than the range defined by the present invention, it may be less adhesive to the foam and may thus be difficult to use successfully as an internal box of a refrigerator. If the internal box has a lower vinyl cyanide content in the resin composition used than the range defined by the present invention, it may be less resistant to flons and may thus cause stress cracking at the portion of the internal box of a refrigerator, where distortion is concentrated.

Therefore, the present invention is expected to have an extensive utility in the field of producing an internal box of a refrigerator under the trend where use of flons is restricted.

BEST MODE FOR THE PRACTICE OF THE INVENTION

Thermoplastic resin composition (part 1)

The thermoplastic resin composition for use as an internal box material of a refrigerator according to the present invention comprises a graft copolymer comprising a synthetic rubber based on a conjugated diene as the so-called "trunk polymer" of the graft copolymer, and the thermoplastic resin compositions according to the present invention are basically classified into the following two types in view of the methods for providing the resin composition with a prescribed rubber content and a high nitrile content:

(a) those directly obtained as a thermoplastic resin composition having a conjugated diene-based synthetic rubber content in the range of 10 to 20% by weight produced by polymerizing 80 to 90 parts by weight of a vinyl cyanide compound (referred to herein as A)+an aromatic vinyl compound (referred to herein as S) (A: 50 to 75% by weight; S: 25 to 50% by weight) in the presence of 10 to 20 parts by weight of a conjugated diene-based synthetic rubber (referred to herein as B) to form a graft copolymer. The terms "parts by weight" and "% by weight" used herein and hereinafter are the values based on the total of the components in question as 100; and (b) those produced as a blend of a thermoplastic resin composition having a prescribed rubber content by incorporating a high rubber/high nitrile ABS resin with a high nitrile AS resin, wherein a graft copolymer produced by polymerizing 30 to 80 parts by weight of a vinyl cyanide compound+an aromatic vinyl compound (A: 50 to 75% by weight; S: 25 to 50% by weight) in the presence of 20 to 70 parts by weight of the conjugated diene-based synthetic rubber is blended with a vinyl cyanide compound aromatic vinyl compound copolymer (A content: 50 to 75% by weight).

According to the present invention, the composition (b) is preferred because of its higher degree of freedom or flexibility in the combination between material composition and physical properties obtainable. The compositions (a) and (b) can be used as an admixture thereof.

In passing, the graft copolymerization comprises polymerizing, in the presence of a trunk polymer, a monomer which should give a polymer to form a branch to the trunk, and it may thus be inevitable even in the case of (a), that a vinyl cyanide compound-aromatic vinyl compound copolymer is produced which is not bonded as a branch to the trunk.

Conjugated diene-based synthetic rubber

It is a conjugated diene-based synthetic rubber used as "the trunk polymer" of a graft copolymer that provides a thermoplastic resin composition used in the present invention with impact resistance required for an internal box material of a refrigerator.

The conjugated diene-based synthetic rubber means either one of a homopolymer of a conjugated diene, a copolymer of conjugated dienes or a random or a block copolymer of a conjugated diene with another comonomer, at least a major portion of rubber elasticity of which is attributable to the conjugated diene.

Examples of the conjugated diene-based synthetic rubber include, for example, polybutadiene, polyisoprene, polychloroprene, a butadiene-styrene copolymer, a butadiene-acrylonitrile copolymer, and the like. Preferably, polybutadiene, butadiere-styrene copolymers and butadiene-acrylonitrile co₁ ..ymers are used. These conjugated diene-based synthetic rubbers can be used in combination.

The conjugated diene-based synthetic rubber is utilized in connection concern with the thermoplastic resin composition of the present invention to produce a graft copolymer having the rubber as a trunk polymer, and this graft copolymer is generally produced by emulsion polymerization of a certain monomer in a latex of the conjugated diene-based synthetic rubber. The latex of the conjugated diene-based synthetic rubber has preferably an average particle diameter of the rubber particles in the range of 0.01 to 10 μm, particularly in the range of 0.1 to 0.5 μm. If a synthetic rubber latex having an average particle diameter in the latter range is used, excellent balance of physical properties can be attained.

Monomers

A vinyl cyanide compound is one of the monomers which should form a branch polymer.

The vinyl cyanide compound used according to the present invention means acrylonitrile, methacrylonitrile or the like, among which acrylonitrile is preferably used. These vinyl cyanide compounds can be used in combination.

An aromatic vinyl compound as another monomer which should form a branch polymer includes styrene, nucleus- and/or side chain-substituted styrenes such as α-methylstyrene, p-methylstyrene, vinyltoluene and the like, among which styrene is preferably used. These aromatic vinyl compounds can be used in combination.

It is necessary for the total of the monomer mixture used for the graft copolymer according to the present invention to comprise 50–75% by weight, preferably 50–66% by weight, of a vinyl cyanide compound and 25–50% by weight, preferably 34–50% by weight, of an aromatic vinyl compound. If the content of the vinyl cyanide compound is less than 50% by weight, stress cracking resistance against HCFC-123 may be insufficient. On the other hand, if the vinyl cyanide compound exceeds 75% by weight, easiness of formability may be lost.

The monomer which should form a branch polymer in the present invention can contain a small amount of another copolymerizable comonomer in addition to the abovementioned two components. This is the reason why the monomer is defined as "consisting essentially of a vinyl cyanide compound and an aromatic vinyl compound." As the specific examples of such comonomers, there are mentioned esters of acrylic acid or methacrylic acid (e.g. $C_1$–$C_6$ alkyl esters such as methyl, ethyl, cyclohexyl esters), vinyl esters (e.g. vinyl acetate), and the like.

Preparation of a graft copolymer

The graft copolymer according to the present invention is generally prepared by emulsion polymerization. Molecular weight modifiers, initiators and emulsifiers which are usually used in emulsion polymerization can be used. For example, mercaptans are used as the molecular weight modifiers, organic peroxides or persulfates are used as the initiators, and fatty acid salts, alkyl sulfate salts, alkylbenzene sulfonic acid salts, or alkyl diphenyl ether disulfonic acid salts are used as the emulsifiers.

Preferred graft polymerization is as follows: Prescribed amounts of a conjugated diene-based synthetic rubber, an emulsifier, an initiator and water are charged in a polymerization vessel and agitated under a nitrogen stream. The monomer mixture is divided into two batches, which are used in two stages. At a predetermined temperature, 90–98% by weight of a first batch of monomer (mixture) (the total of this monomer and a second batch of monomer described below being 100% by weight), comprising 51–84% by weight of a vinyl cyanide compound and 16–49% by weight of an aromatic vinyl compound and a predetermined amount of a molecular weight modifier are continuously added within a predetermined period of time to effect graft copolymerization. After the addition of the first stage monomer mixture, 2–10% by weight of a second stage or remaining batch of monomer comprising an aromatic vinyl compound (the total of this monomer and the aforementioned first batch of monomer (mixture) being 100% by weight) is continuously added within a predetermined period of time at a predetermined temperature to complete the graft copolymerization. In this connection, along with the progress of the graft copolymerization, a predetermined amount of the initiator and a predetermined amount of water can be continuously added within a prescribed period of time. Such a polymerization method wherein the composition of the monomer mixture to be added continuously during the graft copolymerization is varied is desirable for keeping the stability of the high nitrile content resin latex during and after polymerization at a higher level. The addition of the first stage monomer mixture is conducted preferably in 2 hours or more in order to make the composition of the graft copolymer produced uniform. The addition of the second stage monomer is conducted preferably in 20 minutes or more in order to stabilize the high nitrile content resin latex effectively during polymerization. The amounts of an emulsifier, an initiator and a molecular weight modifier and the temperature for performing the graft copolymerization are varied depending on the target values for the degree of grafting or the molecular weight of a graft copolymer produced. The graft copolymer produced is obtained in a conventional manner in an emulsion polymerization method including coagulation of emulsion, washing and drying of the coagulum.

Degree of grafting and other parameters

The graft copolymer according to the present invention preferably meets the following conditions.

$0.30 \leq (G-R)/R \leq 0.50$, preferably
$0.37 \leq (G-R)/R \leq 0.50$ wherein

G: a percentage by weight of a gel in the graft copolymer, calculated on the insoluble matter obtained by dissolution of the graft copolymer in acetonitrile and then separation from the solution by centrifugation.

R: a rubber content of the graft copolymer.

If the value of $(G-R)/R$ (referred to hereinafter as degree of grafting) is less than 0.30, a high physical property balance of rigidity and impact resistance may tend to be decreased. On the other hand, if the degree of grafting exceeds 0.50, easiness of formability may tend to be decreased.

The molecular weight of the graft copolymer according to the present invention is preferably such that the specific viscosity, which is determined on a solution of 0.1 g of an acetonitrile soluble portion of the graft copolymer in 100 ml of dimethylformamide measured by a viscometer, is in the range of 0.04–0.09, more preferably 0.058–0.085 for attaining easy formability.

AS resins

According to the present invention, the vinyl cyanide compound/aromatic vinyl compound copolymer to be blended with a graft copolymer when the graft copolymer has a high rubber content/high nitrile content, should comprise 50–75% by weight, preferably 50–66% by weight, of a vinyl cyanide compound and 25–50% by weight, preferably 34–50% by weight, of an aromatic vinyl compound. If the content of the vinyl cyanide compound is less than 50% by weight, stress cracking resistance against HCFC-123 may be insufficient. On the other hand, if the content of the vinyl cyanide compound exceeds 75% by weight, easiness of formability may be lost.

The vinyl cyanide compound/aromatic vinyl compound copolymer, or AS resin, is generally produced by the suspension polymerization method. Molecular weight modifiers, initiators, suspension stabilizers and suspension stabilizing aids which are usually used in suspension polymerization can be used. For example, mercaptans and terpenes are used as the molecular weight modifiers, azo compounds are used as the initiator, polyvinyl alcohol or acrylic acid copolymers are used as the suspension stabilizers, and salts are used as the suspension stabilizing aids. The polymerization method is also conducted according to the one usually used in the suspension polymerization method. Predetermined amounts of a monomer mixture, a molecular weight modifier, a suspension stabilizer, a suspension stabilizing aid and water are charged in a polymerization vessel, and an initiator is injected with agitation under a nitrogen stream to start copolymerization. Immediately after the initiation, the monomers are successively added so that the composition of the monomer mixture in the polymerization vessel will be at a desired level to complete the copolymerization. The composition of the monomer mixture and the amounts of the molecular weight modifier, the suspension stabilizer and the suspension stabilizing aid may vary depending on the target values for the component ratios and the molecular weights of the vinyl cyanide compound-/aromatic vinyl compound copolymer produced. The vinyl cyanide compound/aromatic vinyl compound copolymer produced is subjected to removal of unreacted monomers, and washed and dried by a usual method in the suspension polymerization method.

The molecular weight of the vinyl cyanide compound/aromatic vinyl compound copolymer according to the present invention is preferably such that its specific viscosity is in the range of 0.04–0.09, more preferably 0.058–0.085, for attaining easy formability.

The descriptions for the vinyl cyanide compound and the aromatic vinyl compound and for "the monomer mixture consisting essentially of these monomers" will apply to the AS resins.

Rubber contents and other parameters

It is required for the high nitrile thermoplastic resin composition according to the present invention to have a rubber content in the range of 10–20% by weight, preferably 13–18% by weight, in order to obtain physical properties suitable to the internal box of a refrigerator. If the rubber content is less than 10% by weight, impact resistance may be insufficient and cracking may thus be generated when an article housed within the refrigerator hits against it. On the other hand, if the rubber content exceeds 20% by weight, rigidity may be insufficient and a vacuum-formed internal box is deformed. As described above, in order that the rubber content of the high nitrile thermoplastic resin composition may be in the range of 10–20% by weight, a graft copolymer having a rubber content of 10–20% by weight may be directly used, or the vinyl cyanide compound/aromatic vinyl compound copolymer may be blended with a graft copolymer having a rubber content of 20–70% by weight so that the rubber content in the blend will be 10–20% by weight. When the graft copolymer and the vinyl cyanide compound/aromatic vinyl compound copolymer are blended, the ratio of the vinyl cyanide compound/aromatic vinyl compound in the graft copolymer and the ratio of the vinyl cyanide compound/aromatic vinyl compound in the vinyl cyanide compound/aromatic vinyl compound copolymer desirably have a difference not exceeding 10% by weight. If the difference is large, uniformity of the blend may be lowered and thus a high physical property balance may not be obtained. On the other hand, if the molecular weight of the graft copolymer and the molecular weight of the vinyl cyanide compound/aromatic vinyl compound copolymer lie respectively in the above-mentioned ranges, they may be in any combinations provided that target physical properties and formability are obtainable in the blend.

The specific viscosity of the high nitrile thermoplastic resin composition, or more precisely the specific viscosity of the acetonitrile-soluble portion of the composition, is preferably in," the range of 0.04–0.09, more preferably 0.058–0.085. A specific viscosity less than 0.04 may produce unfavorable results such as poor vacuum formability as the internal box of a refrigerator, and a specific viscosity exceeding 0.09 may produce unfavorable results such as poor compatibility of the graft copolymer in the resin composition, poor formability or the heat decomposition or scorching of the composition.

Formation of a composition

The thermoplastic composition as the object of the present invention can be produced by any means which is capable of uniformly kneading the predetermined components, preferably means which result in softening or melting of resin components.

In mixing, conventional mixing apparatuses in the melt mixing of resins such as a uniaxial extruder, a biaxial extruder, a Banbury mixer or a kneader can be used.

In this connection, additives such as an anti-oxidant, a UV absorber, a lubricating agent or an antistatic agent, or a coloring matter can be incorporated.

Formation of the internal box of a refrigerator

The high nitrile thermoplastic resin composition according to the present invention is formed into an internal box or a door interior of a refrigerator by a conventional manner for producing an internal box of a refrigerator. Generally, a resin composition is melted, formed into a sheet or plate and chilled and solidified with a roll by means of an extruder provided with a coat hanger die. Subsequently, the sheet is formed into an interior and a door internal box of a refrigerator by a vacuum molding machine.

Thermoplastic resin composition (part 2)

The resin compositions for a refrigerator according to the present invention are the ones described above including its production method and the formation of the composition. The preferred one among them has also been described above.

In other words, the preferred resin composition for a refrigerator according to the present invention is characterized by the following conditions (i)–(iv).

(i) The high nitrile thermoplastic resin composition is a blend of:

(A) a graft copolymer obtained by polymerizing 30–80 parts by weight, preferably 40–70 parts by weight, of a monomer mixture consisting essentially of 50–75% by weight, preferably 50–66% by weight, of a vinyl cyanide compound and 25–50% by weight, preferably 34–50% by weight, of an aromatic vinyl compound in the presence of 20–70 parts by weight, preferably 30–60 parts by weight, of a conjugated diene-based synthetic rubber with (B) a vinyl cyanide compound/aromatic vinyl compound copolymer in which the content of the vinyl cyanide compound is in the range of 50–75% by weight, preferably 50–66% by weight, and the content of the aromatic vinyl compound is thus in the range of 25-50% by weight, preferably 34-50% by weight, so that the rubber content in the blend is in the range of 10-20% by weight, preferably 13-18% by weight (the aforementioned parts by weight and % by weight are respectively the values based on the total amount of these components in question as 100). Preferably, the composition is one which has the content of the vinyl cyanide compound in the vinyl cyanide compound-/aromatic vinyl compound copolymer contained therein in the range of 50-75% by weight, particularly 50-65% by weight.

(ii) The graft copolymer satisfies the following equations:

$0.30 \leq (G-R)/R \leq 0.50$, preferably
$0.37 \leq (G-R)/R \leq 0.50$ wherein

G: a percentage by weight of a gel in the graft copolymer, calculated on the insoluble matter obtained by dissolution of the graft copolymer in acetonitrile and then separation from the solution by centrifugation.

R: a rubber content of the graft copolymer.

(iii) The graft copolymer has a specific viscosity in the range of 0.04-0.09, preferably 0.058-0.085 determined on a solution of 0.1 g of an acetonitrile soluble portion of the graft copolymer in 100 ml of dimethylformamide measured by a viscometer. As described above, both of the vinyl cyanide compound/aromatic vinyl compound copolymer to be incorporated in the graft copolymer and the high nitrile thermoplastic resin composition after the incorporation of the copolymer have a specific viscosity in the range of 0.04-0.09, preferably 0.058-0.085.

(iv) The graft copolymer is produced by emulsion polymerization of predetermined amounts of the monomers in the conjugated diene-based synthetic rubber latex having an average diameter of rubber particles in the range of 0.01-10 μm, preferably 0.1-0.5 μm.

EXPERIMENTAL EXAMPLES

The following Examples and Comparative Examples are provided for specifically illustrating the present invention. The properties of the internal box of a refrigerator were evaluated for the following 5 items.

(1) Flexural modulus

Flexural modulus was measured in accordance with JIS K-7203 and taken as an index of rigidity required for the internal box of a refrigerator.

(2) Izod impact value

Izod impact value was measured in accordance with JIS K-7110 and taken as an index of impact resistance required for the internal box of a refrigerator.

(3) Melt flow rate

Melt flow rate was measured in accordance with JIS K-7210 and taken as an index of formability required for the internal box of a refrigerator (test condition: Table 1, condition No. 11) (g/10 min).

(4) Critical distortion value

A test piece in the shape of strip of 35 mm×230 mm×2 mm prepared by compression molding was set on a bending form (a bending distortion jig similar to a ¼ elliptical jig having a maximum distortion value of 0.7%), which was left standing at a temperature of 23° C. under an atmosphere of CFC-11, HCFC-123 or HCFC-141b. The appearance of the test piece was then visually judged. The test results were taken as the indices of stress cracking resistance against CFC-11, HCFC-123 and HCFC-141b.

(5) Low temperature distortion value for generating whitening

A test piece was prepared such that a rigid polyurethane foam produced in accordance with the in-situ foaming method by means of CFC-11, HCFC-123 or HCFC-141b was in adherence to a dumbbell test piece of the resin composition prepared by compression forming. The test piece was fixed on a jig in such a state that tensile distortion was loaded to the test piece at 23° C., and was cooled to −20° C., whereby the presence of crazing or cracking after 17 hours was visually judged. The judgements were taken as indices of stress cracking resistance against CFC-11, HCFC-123 and HCFC-141b.

Dumbbell test piece had a larger width of 30 mm, a smaller width of 10 mm, a length of 115 mm and a thickness of 1 mm, and a polyurethane foam having a width of 10 mm, a thickness of 10 mm and a length of 50 mm was adhered to the smaller width portion.

(6) Measurement of AN content

The solvent*-soluble portion of the graft copolymer after having been isolated and dried and an AN/ST (acrylonitrile/styrene) copolymer as such were subjected to elemental analysis to obtain the "content of the acrylonitrile component (% by weight)" from the ratios of C, H and N.

(7) Specific viscosity

The 0.1 g portion of the solvent*-soluble portion of the graft copolymer after having been isolated and dried and an AN/ST copolymer as such were taken and dissolved in 100 ml of dimethylformamide, and the specific viscosity was measured at 23° C. by a viscometer.

* solvent: acetonitrile for the high nitrile resin; and acetone for the ABS resin.

(8) Degree of grafting

The graft copolymer was dispersed in a solvent* and separated into a solvent-soluble portion and solvent-insoluble portion with a centrifuge. The weight fraction of the solvent soluble portion (having been dried) was expressed as G and the rubber content of the graft copolymer was expressed as R to calculate the degree of grafting by an equation (G−R)/R.

(9) Average rubber particle diameter

The average rubber particle diameter (μm) of a graft copolymer latex was measured with a Coulter Nano-Sizer.

EXAMPLE 1

A. Preparation of a vinyl cyanide compound/aromatic vinyl compound/diene-based rubber graft copolymer (A)

(a) Preparation of a diene-based rubber latex

| | |
|---|---|
| 1,3-butadiene | 90 parts by weight |
| Styrene | 10 parts by weight |
| Fatty acid soap | 4 parts by weight |
| Potassium persulfate | 0.15 parts by weight |
| t-dodecylmercaptan | 0.3 parts by weight |

| | |
|---|---|
| Deionized water | 155 parts by weight |

The mixture comprising the above-described components was charged in a stainless steel reaction vessel, and reaction was continued with agitation under a nitrogen stream at 68° C. for 6 hours. The temperature of the mixture was then raised from 68° C. to 80° C. over 1.5 hours. The reaction was further continued at 80° C. for 2.5 hours and completed by cooling the mixture.

The latex obtained had a solid content of 39.9%.

(b) Preparation of a graft copolymer

| | |
|---|---|
| Diene-based rubber latex described in (a) | 50 parts by weight (as the solid content) |
| Sodium alkyldiphenyl ether disulfonate | 2 parts by weight (as the solid content) |
| Deionized water | 200 parts by weight (as the solid content) |
| Potassium persulfate | 0.085 parts by weight (as the solid content) |

The above-mentioned components were charged in a flask and kept at 65° C. with agitation under a nitrogen stream, and the first stage monomer mixture described below was successively added over a period of 4 hours.

| | |
|---|---|
| Acrylonitrile | 27.5 parts by weight |
| Styrene | 19.2 parts by weight |
| n-dodecylmercaptan | 1.15 parts by weight |

After the addition of the first stage monomer mixture, the reaction system was kept at a temperature of 65° C., and the second stage monomer described below was added continuously over a period of 1 hour.

| | |
|---|---|
| Styrene | 3.3 parts by weight |

In addition, on 30 minutes after starting the addition of the first stage monomer mixture, the following initiator was continuously added as a solution in deionized water over a period of 4 hours.

| | |
|---|---|
| Potassium persulfate | 0.17 part by weight |

The resin latex obtained had a solid content of 3.5%.

The resin latex was coagulated with an aqueous magnesium sulfate solution, washed with water, dried to give a polymer powder.

B. Preparation of a vinyl cyanide compound/aromatic vinyl compound copolymer (B)

| | |
|---|---|
| Acrylonitrile | 55 parts by weight |
| Styrene | 5 parts by weight |
| Terpene oil | 0.52 parts by weight |
| Di-t-butylparacresol | 0.04 parts by weight |
| Deionized water | 90 parts by weight |
| Acrylic acid-octyl acrylate copolymer | 0.03 parts by weight |
| Sodium chloride | 0.18 parts by weight |

The mixture comprising the above-described components was charged in a stainless steel reaction vessel. The temperature of the mixture was raised to 105° C. with agitation under a nitrogen atmosphere, and 0.15 part by weight of 1-t-butylazo-1-cyano-cyclohexane dissolved in a small amount of styrene was added with pressure by nitrogen to start polymerization reaction. Immediately after the initiation, 40 parts by weight of styrene was continuously added to the reaction system over a period of 4 hours. During this period, the reaction temperature was raised from 105° C. on the initiation of the polymerization to 141° C. After the continuous addition of styrene to the reaction system had completed, the temperature was raised to 145° C. over a period of 20 minutes, and stripping was conducted at this temperature for 2.5 hours. Then, according to the usual manner, the reaction system was cooled and the polymer was separated, washed and dried to give a polymer in the shape of beads.

Twenty-eight parts by weight of the vinyl cyanide compound/aromatic vinyl compound/conjugated diene-based synthetic rubber graft copolymer (A) obtained by the above-described method and 72 parts by weight of the vinyl cyanide compound/aromatic vinyl compound copolymer (B) were melt-kneaded to give a high nitrile thermoplastic resin composition having a rubber content of 14% by weight.

EXAMPLE 2

Thirty-two parts by weight of the vinyl cyanide compound/aromatic vinyl compound/conjugated diene-based synthetic rubber graft copolymer (A) and 68 parts by weight of the vinyl cyanide compound/aromatic vinyl compound copolymer (B) referred to in Example 1 were melt-kneaded on a Banbury mixer to give a high nitrile content thermoplastic resin composition having a rubber of 16% by weight.

EXAMPLE 3

Thirty-six parts by weight of the vinyl cyanide compound/aromatic vinyl compound/conjugated diene-based synthetic rubber graft copolymer (A) and 64 parts by weight of the vinyl cyanide compound/aromatic vinyl compound copolymer (B) referred to in Example 1 were melt-kneaded on a Banbury mixer to give a high nitrile content thermoplastic resin composition having a rubber of 18% by weight.

EXAMPLE 4

Twenty-eight parts by weight of the vinyl cyanide compound/aromatic vinyl compound/conjugated diene-based synthetic rubber graft copolymer (A) obtained in the same manner as in the part A of Example 1 except that, in the preparation of the graft copolymer of the part A (b) in Example 1, the composition of the first stage monomer mixture was changed into the following composition:

| | |
|---|---|
| Acrylonitrile | 27.5 parts by weight |
| Styrene | 19.2 parts by weight |
| n-Dodecylmercaptan | 4.6 parts by weight | and 72 parts by weight of the vinyl cyanide to in Example 1 were melt-kneaded on a Banbury mixer to give a high nitrile content thermoplastic resin composition having a rubber content of 14% by weight.

EXAMPLE 5

Twenty-eight parts by weight of the vinyl cyanide compound/aromatic vinyl compound/conjugated diene-based synthetic rubber graft copolymer (A) obtained in the same manner as in the part A of Example 1 except that, in the preparation of the graft copolymer of the part A (a) of Example 1, the composition:

| | | |
|---|---|---|
| Diene-based rubber latex of A (a) of Example 1 | 50 | parts by weight (solid content) |
| Sodium alkyldiphenyl ether disulfonate | 2.5 | parts by weight (solid content) |
| Deionized water | 200 | parts by weight (solid content) |
| Potassium persulfate | 0.085 | parts by weight (solid content) | was initially charged into a flask and that the first stage monomer mixture having the following composition:

| | |
|---|---|
| Acrylonitrile | 27.5 parts by weight |
| Styrene | 19.2 parts by weight |
| n-Dodecyl mercaptan | 2.3 parts by weight | was used, and 72 parts by weight of the vinyl cyanide compound/aromatic vinyl compound copolymer (B) obtained in the same manner as in the part B of Example 1 except that, in the preparation of the vinyl cyanide compound/aromatic vinyl compound copolymer, the composition:

| | |
|---|---|
| Acrylonitrile | 55 parts by weight |
| Styrene | 5 parts by weight |
| Terpene oil | 0.65 parts by weight |
| Di-t-butyl-para-cresol | 0.02 parts by weight |
| Deionized water | 70 parts by weight |
| Acrylic acid-octyl acrylate copolymer | 0.03 parts by weight |
| Sodium chloride | 0.18 parts by weight | was charged, were melt-kneaded on a Banbury mixer to give a high nitrile content thermoplastic resin composition having a rubber content of 14% by weight.

EXAMPLE 6

Twenty-eight parts by weight of the vinyl cyanide compound/aromatic vinyl compound/conjugated diene-based synthetic rubber graft copolymer (A) obtained in the same manner as in the part A of Example 1 except that, in the preparation of the graft copolymer of the part A (b) of Example 1, the first stage monomer mixture had the following composition:

| | |
|---|---|
| Acrylonitrile | 35 parts by weight |
| Styrene | 11.7 parts by weight |
| n-Dodecyl mercaptan | 2.3 parts by weight | and 72 parts by weight of the vinyl cyanide compound/aromatic vinyl compound copolymer (B) obtained in the same manner as in the part B of Example 1 except that, in the preparation of the vinyl cyanide compound/aromatic vinyl compound copolymer, the composition:

| | |
|---|---|
| Acrylonitrile | 70 parts by weight |
| Styrene | 3 parts by weight |
| Terpene oil | 0.6 parts by weight |
| Di-t-butyl-para-cresol | 0.02 parts by weight |
| Deionized water | 70 parts by weight |
| Acrylic acid-octyl acrylate copolymer | 0.03 parts by weight |
| Sodium chloride | 0.4 parts by weight | was used and the amount of styrene to be added continuously was 27 parts by weight, were melt-kneaded on a Banbury mixer to give a high nitrile content thermoplastic resin composition having a rubber content of 14% by weight.

COMPARATIVE EXAMPLE 1

Twenty-eight parts by weight of the vinyl cyanide compound/aromatic vinyl compound/conjugated diene-based synthetic rubber graft copolymer (A) obtained in the same manner as in the part A of Example 1 except that, in the preparation of the graft copolymer of the part A (b) of Example 1, the temperature of the graft copolymerization was set at 62° C. and the first stage monomer mixture had the following formulation:

| | |
|---|---|
| Acrylonitrile | 27.5 parts by weight |
| Styrene | 19.2 parts by weight |
| n-Dodecyl mercaptan | 6.9 parts by weight | and 72 parts by weight of the vinyl cyanide compound/aromatic vinyl compound copolymer (B) referred to in the part B of Example 1 were melt-kneaded on a Banbury mixer to give a high nitrile content thermoplastic resin composition having a rubber content of 14% by weight.

COMPARATIVE EXAMPLE 2

| | |
|---|---|
| Diene-based rubber latex of the part A (a) of Example 1 | 35 parts by weight |
| Fatty acid soap | 0.63 parts by weight |
| Potassium hydroxide | 0.06 parts by weight |

These components were charged into a flask and maintained at a temperature of 72° C. with agitation under nitrogen stream, and the following components were continuously added over a period of 4.5 hours:

| | |
|---|---|
| Acrylonitrile | 29.2 parts by weight |
| Styrene | 35.8 parts by weight |
| Terpene oil | 0.33 parts by weight |
| Potassium persulfate | 0.33 parts by weight |

The resin latex thus obtained had a solid content of 39.7%

The resin latex was coagulated in an aqueous magnesium sulfate solution, the coagulum obtained was washed with water and dried to give the vinyl cyanide compound/aromatic vinyl compound/conjugated diene-based rubber graft copolymer (A).

A vinyl cyanide compound/aromatic vinyl compound copolymer (B) was obtained in the same manner as in the part B of Example 1 except that, in the preparation of the vinyl cyanide compound/aromatic vinyl compound copolymer, the composition:

| | |
|---|---|
| Acrylonitrile | 45 parts by weight |
| Styrene | 11.4 parts by weight |
| Terpene oil | 0.45 parts by weight |
| Di-t-butyl-para-cresol | 0.04 parts by weight |
| Deionized water | 70 parts by weight |

| | |
|---|---|
| Acrylic acid-octyl acrylate copolymer | 0.03 parts by weight |
| Sodium chloride | 0.18 parts by weight | was used and the amount of styrene to be added continuously was 43.6 parts by weight. Forty parts by weight of the vinyl cyanide compound/aromatic vinyl compound/diene-based synthetic rubber graft copolymer (A) and 60 parts by weight of the vinyl cyanide compound/aromatic vinyl compound copolymer (B) obtained by the above-described methods were melt-kneaded on a Banbury mixer to give a high nitrile thermoplastic resin composition having a rubber content of 14% by weight.

COMPARATIVE EXAMPLE 3

"TUFREX YT-212" manufactured by Mitsubishi Monsanto Chemical Company, Japan was prepared. This is an ABS resin which has widely been used for internal boxes of refrigerators.

| | Example 1 | Example 2 | Example 3 | Example 4 | Example 5 | Example 6 |
|---|---|---|---|---|---|---|
| AN content of graft copolymer (% by weight) | 52 | 52 | 52 | 55 | 54 | 66 |
| Specific viscosity of graft copolymer | 0.081 | 0.081 | 0.081 | 0.040 | 0.060 | 0.070 |
| Degree of grafting of graft copolymer | 0.47 | 0.47 | 0.47 | 0.33 | 0.37 | 0.48 |
| AN content of AN/ST copolymer (% by weight) | 57 | 57 | 57 | 57 | 55 | 66 |
| Specific viscosity of AN/ST copolymer | 0.072 | 0.072 | 0.072 | 0.072 | 0.058 | 0.066 |
| Rubber content in high nitrile thermoplastic resin (% by weight) | 14 | 16 | 18 | 14 | 14 | 14 |
| Rubber particle diameter of graft copolymer ($\mu$m) | 0.15 | 0.16 | 0.15 | 0.15 | 0.10 | 0.10 |
| Flexural modulus (kg/cm$^2$) | 28000 | 26000 | 24000 | 27500 | 27000 | 28000 |
| Izod impact value (kg·cm/cm) | 30 | 42 | 52 | 32 | 25 | 25 |
| Melt flow rate (g/10 min.) | 3.0 | 2.5 | 2.0 | 4.0 | 6.0 | 4.0 |
| Critical distortion value: | | | | | | |
| CFC-11 | ○ No change | ○ No change | ○ No change | ○ No change | ○ No change | ○ No change |
| HCFC-123 | ○ No change | ○ No change | ○ No change | ○ No change | ○ No change | ○ No change |
| HCFC-141b | ○ No change | ○ No change | ○ No change | ○ No change | ○ No change | ○ No change |
| Low temperature distortion value for generating whitening: | | | | | | |
| CFC-11 | 1.3 | 1.3 | 1.3 | 1.3 | 1.3 | 1.3 |
| HCFC-123 | 0.8 | 0.8 | 0.8 | 0.8 | 0.8 | 0.9 |
| HCFC-141b | 0.8 | 0.8 | 0.8 | 0.8 | 0.8 | 0.9 |

| | Comparative Example 1 | Comparative Example 2 | Comparative Example 3 |
|---|---|---|---|
| AN content of graft copolymer (% by weight) | 55 | 43 | 23 |
| Specific viscosity of graft copolymer | 0.026 | 0.093 | 0.065 |
| Degree of grafting of graft copolymer | 0.21 | 0.85 | 0.49 |
| AN content of AN/ST copolymer (% by weight) | 57 | 47 | 26 |
| Specific viscosity of AN/ST copolymer | 0.072 | 0.069 | 0.100 |
| Rubber content in high nitrile thermoplastic resin (% by weight) | 14 | 14 | 13 |
| Rubber particle diameter of graft copolymer ($\mu$m) | 0.15 | 0.21 | 0.40 |
| Flexural modulus (kg/cm$^2$) | 27500 | 26000 | 24000 |
| Izod impact value (kg·cm/cm) | 10 | 28 | 20 |
| Melt flow rate (g/10 min.) | 5.0 | 3.0 | 4.5 |
| Critical distortion value: | | | |
| CFC-11 | ○ No change | ○ No change | ○ No change |
| HCFC-123 | ○ No change | × Crazing at 0.4% | × Whole swelling |
| HCFC-141b | ○ No change | × Crazing at 0.5% | × Whole swelling |

-continued

| | | | |
|---|---|---|---|
| Low temperature distortion value for generating whitening: | | | |
| CFC-11 | 1.3 | 1.1 | 0.6 |
| HCFC-123 | 0.8 | 0.4 | 0.2 |
| HCFC-141b | 0.8 | 0.2 | 0.2 |

Analysis and evaluation of the results (1) As is apparent from Examples and Comparative Examples, stress cracking resistances against CFC-11, HCFC-123 and in HCFC-141b depend on the ratios of the vinyl cyanide compound/aromatic vinyl compound in the graft copolymer and in the vinyl cyanide compound/aromatic vinyl compound copolymer.

When the content of the vinyl cyanide compound is in the range of 50–75% by weight, stress cracking is not found on the measurement of the critical distortion values in the atmospheres of HCFC-123 and HCFC-141b. When the content of the vinyl cyanide compound is less than 50% by weight, stress cracking is found at the distortion of 0.4% (HCFC-123) or 0.5% (HCFC-141b), and the ABS resin is swollen and dissolved.

When the content of the vinyl cyanide compound is in the range of 50–75% by weight, the low temperature distortion value for generating whitening is 1.3% or more in the case where a rigid polyurethane foam foamed with CFC-11 is in adherence and 0.8% or more in the case where a rigid polyurethane foam foamed with HCFC-123 or HCFC-141b is in adherence. All of these values exceed the value of 0.6% in the case where a rigid polyurethane foam foamed with CFC-11 is in adherence to an ABS resin as a model of a current refrigerator and are thus improved. When the content of the vinyl cyanide compound is less than 50% by weight, the low temperature distortion value for generating whitening is 0.4% and 0.2% in the cases where rigid polyurethane foams foamed with HCFC-123 and HCFC-141b are respectively in adherence, and 0.2% in the case where a rigid polyurethane foam foamed with HCFC-123 is in adherence to an ABS resin. All of these values are inferior to the value of the current refrigerator model.

From these results, it is assumed that an internal box of a refrigerator manufactured by a high nitrile content thermoplastic resin composition having a ratio of a vinyl cyanide compound/aromatic vinyl compound such that the amount of the vinyl cyanide compound comprises 50–75% by weight has high stress cracking resistance against CFC-11, HCFC-123 and HCFC-141b.

(2) As is apparent from Examples and Comparative Examples, the high balance of rigidity and impact resistance of a high nitrile thermoplastic resin composition depends on the degree of grafting a graft copolymer.

When the degree of grafting is in the range of 0.30–0.50, the Izod impact value is 25 kg.cm/cm or more with a rubber content of 14% by weight and a flexural modulus of 27000 kg/cm$^2$ or more. When the degree of grafting is less than 0.30, the Izod impact value is only 10 kg.cm/cm even with the rubber content of 14% by weight.

From these results, it is assumed that an internal box of a refrigerator manufactured by a high nitrile content thermoplastic resin composition with a degree of grafting in the range of 0.30–0.50 has high balance of rigidity and impact resistance.

(3) It is thought, in view of ABS resins currently used for the internal box and door interior of a refrigerator, that a flexural modulus of 23000 kg/cm$^2$ or more is required for preventing the deformation of the box vacuum-formed, and an Izod impact value of 15 kg.cm/cm or more is required for avoiding the cracking which may be produced when an article housed in the refrigerator hits on the internal box. As is seen from Examples, the high nitrile thermoplastic resin composition having a rubber content in the range of 10–20% by weight meets the requirements.

(4) It is regarded as being adequate that the melt flow rate (condition No. 11) for conventional methods for producing the internal box of a refrigerator such as sheet extrusion and vacuum forming is in the range of 1.0–8.0 g/10 min. When the melt flow rate is less than 1.0 g/10 min, the sheet extrusion or vacuum forming is carried out at higher temperatures which approach the decomposition temperature of the resin composition. On the other hand, when it exceeds 8.0 g/10 min, the resin sheet formed sags due to its weight upon the sheet forming whereby it becomes difficult to conduct the sheet forming or the quality of the product is lowered due to unevenness in the thickness of the sheet. As is shown in Examples, the melt flow rate (condition No. 11) depends on the factors such as ratio of vinyl cyanide compound/aromatic vinyl compound, degree of grafting rubber content, specific viscosity and the like. When these factors are within the ranges defined according to the present invention, the melt flow rate is generally in the range of 1.0–8.0 g/10 min.

INDUSTRIAL APPLICABILITY

The resin composition according to the present invention is fluorinated/chlorinated hydrocarbon resistant, and thus the internal box of a refrigerator made from it also has a high resistance to the solvent/foaming agent. Therefore, the resin composition according to the present invention is advantageously used at present or in future under the situation of severer restriction of use of fluorinated/chlorinated hydrocarbon solvents/foaming agents.

We claim:

1. A high nitrile thermoplastic resin composition, characterized by the following conditions (i)–(vii):
   (i) the high nitrile thermoplastic resin composition comprises a blend of:
   (A) a graft copolymer obtained by polymerizing, in the presence of 20 to 70 parts by weight of a conjugated diene-based synthetic rubber, 30 to 80 parts by weight of a monomer mixture consisting essentially of 50 to 75% by weight of a vinyl cyanide compound and 25 to 50% by weight of an aromatic vinyl compound, with
   (B) a vinyl cyanide compound/aromatic vinyl compound copolymer in which the content of the vinyl cyanide compound is in the range of 50 to 75% by weight and the content of the aromatic vinyl compound is thus in the range of 25 to 50% by weight such that the rubber content is in the range of 10 to 20% by weight, the parts by weight and % by weight being respectively the values based on the total amount of these components in question as 100;

(ii) the graft copolymer (A) satisfies the following equation:

$$0.30 \leq (G-R)/R \leq 0.50,$$

wherein G means a percentage by weight of a gel in the graft copolymer, calculated in the insoluble matter obtained by dissolution of the graft copolymer in acetonitrile and then separation from the solution by centrifugation, and R means a rubber content of the graft copolymer;

(iii) the graft copolymer (A) has a specific viscosity in the range of 0.04–0.09 determined on a solution of 0.1 g of an acetonitrile-soluble portion of the graft copolymer in 100 ml of dimethylformamide measured by a viscometer;

(iv) the graft copolymer (A) has been produced by emulsion polymerization of predetermined amounts of the monomers in the conjugated diene-based synthetic rubber latex having an average diameter of rubber particles in the range of 0.01–10 $\mu$m;

(v) the high nitrile thermoplastic resin composition has a content of the vinyl cyanide compound in the vinyl cyanide compound/aromatic vinyl compound copolymer contained therein in the range of 50–75% by weight;

(vi) the vinyl cyanide compound/aromatic vinyl compound copolymer (B) has a specific viscosity in the range of 0.04–0.09; and (vii) the high nitrile thermoplastic resin composition has a specific viscosity in the range of 0.04–0.09.

2. The high nitrile thermoplastic resin composition according to claim 1, wherein the graft copolymer (A) is obtained by polymerizing, in the presence of 30 to 60 parts by weight of a conjugated diene-based synthetic rubber, 40 to 70 parts by weight of a monomer mixture consisting essentially of 50 to 66% by weight of a vinyl cyanide compound and 34 to 50% by weight of an aromatic vinyl compound, the vinyl cyanide compound/aromatic vinyl compound copolymer (B) has a content of the vinyl cyanide compound in the range of 50 to 66% by weight, and the content of the aromatic vinyl compound is thus in the range of 34 to 50% by weight such that the rubber content is in the range of 13 to 18% by weight, the parts by weight and % by weight being respectively the values based on the total amount of these components in question as 100, the graft copolymer (A) satisfies the following equation:

$$0.37 \leq (G-R)/R \leq 0.50,$$

wherein G and R are as defined in claim 5, the graft copolymer (A) has a specific viscosity in the range of 0.058–0.085, the conjugated diene-based synthetic rubber latex has an average diameter of rubber particles in the range of 0.1–0.5 $\mu$m, the content of the vinyl cyanide compound in the vinyl cyanide compound/aromatic vinyl compound copolymer is in the range of 50 to 66% by weight, the vinyl cyanide compound/aromatic vinyl compound copolymer (B) and the high nitrile thermoplastic resin composition each has a specific viscosity in the range of 0.058–0.085.

* * * * *